Jan. 5, 1960     E. V. SUNDT     2,919,588
DRIVING MECHANISM FOR WINDSHIELD
WIPERS AND THE LIKE
Filed April 16, 1957     2 Sheets-Sheet 1
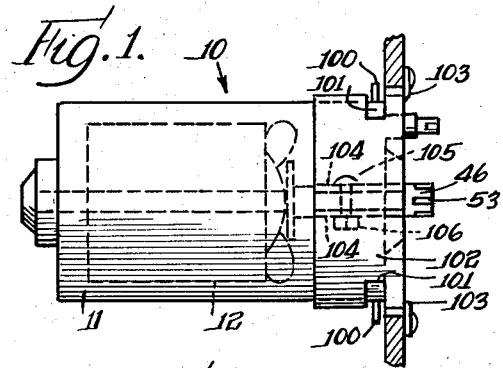
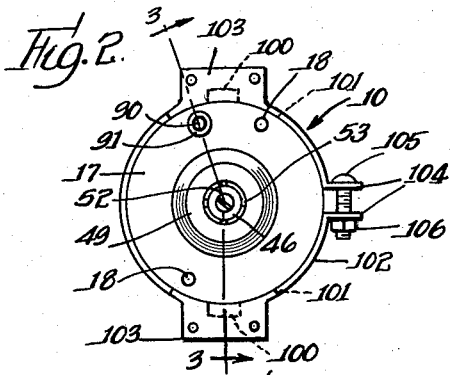
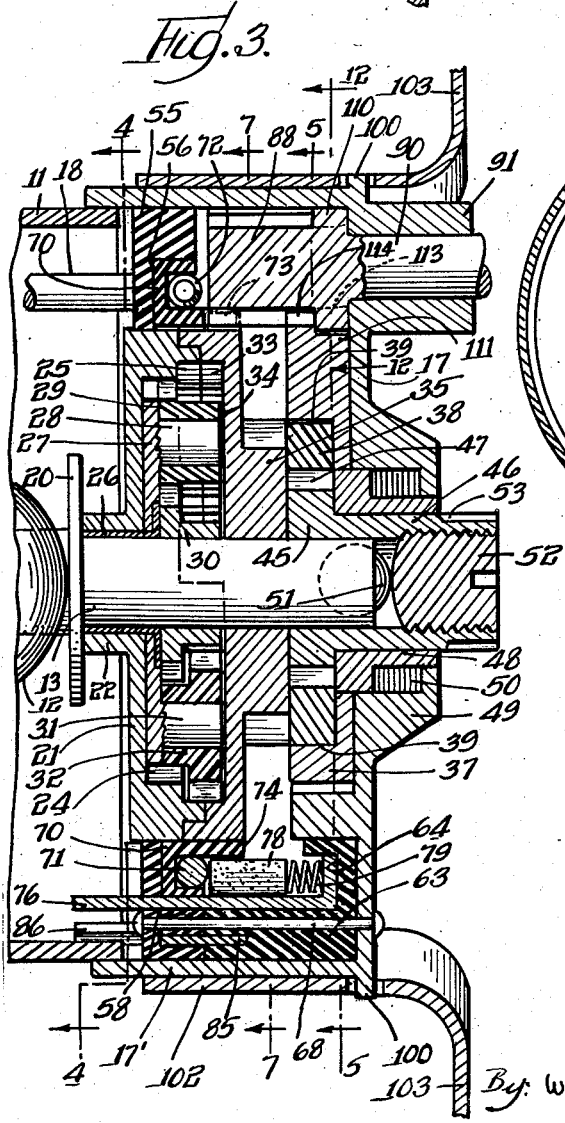
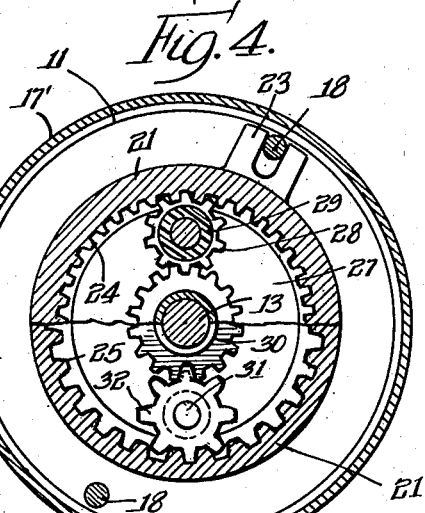
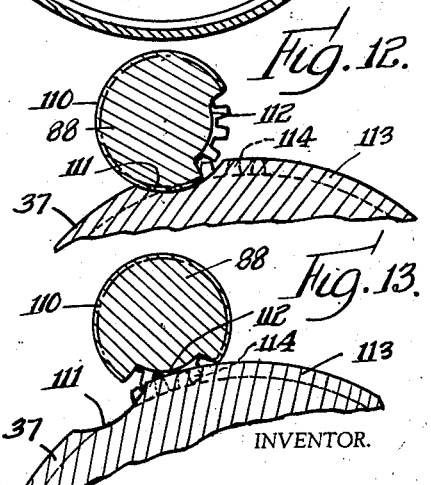
INVENTOR.
Edward V. Sundt
By Wallenstein + Spangenberg Atty's

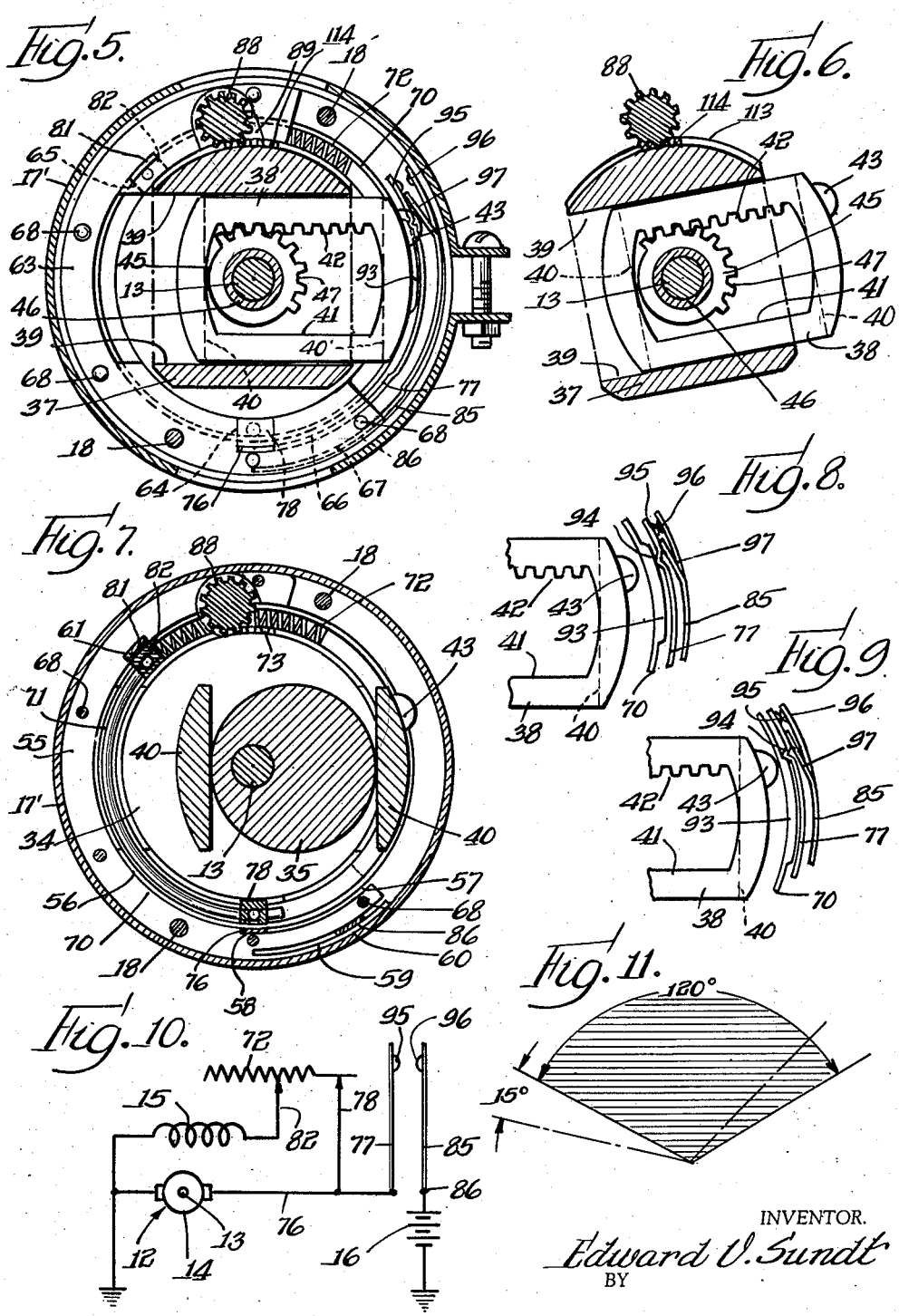

`United States Patent Office`

2,919,588
Patented Jan. 5, 1960

2,919,588

DRIVING MECHANISM FOR WINDSHIELD WIPERS AND THE LIKE

Edward V. Sundt, Wilmette, Ill.

Application April 16, 1957, Serial No. 653,209

13 Claims. (Cl. 74—76)

This invention is directed to a driving mechanism for windshield wipers and the like, and this application is a continuation-in-part of my copending application Serial No. 547,130, filed November 16, 1955, and is also a continuation-in-part of my copending application Serial No. 579,236, filed April 19, 1956, which, in turn, is a continuation-in-part of said application Serial No. 547,130.

The principal object of this invention is to provide an improved driving mechanism for windshield wipers and the like which is simple in construction, foolproof in operation, and inexpensive to manufacture and assemble, wherein the parts of the driving mechanism are symmetrically arranged about a central motor shaft axis, wherein a compounded planetary and planetary-differential speed reducer means is utilized, wherein the windshield wipers and the like are oscillated through a fixed angle of oscillation, wherein operation of the windshield wipers and the like is always stopped in an end position of the fixed angle of oscillation, wherein the fixed angle of oscillation may be shifted, and wherein the fixed angle of oscillation may be shifted when oscillation of the windshield wipers and the like is stopped for parking the windshield wipers and the like beyond the fixed angle of oscillation.

Briefly, the driving mechanism of this invention, for windshield wipers and the like, includes an electric motor, a shaft rotated thereby, and a compounded planetary and planetary-differential speed reducer means concentric with the motor shaft and rotated at a reduced speed thereby. The planetary reducer, which is concentric with the motor shaft, includes a drive gear driven by the shaft, a stationary internal gear, a planetary gear meshing with the drive gear and the internal gear, and a carrier carrying the planetary gear and rotatable about the shaft axis. The planetary-differential reducer, which is also concentric with the motor shaft, includes a planetary-differential gear, carried by the carrier of the planetary reducer, a stationary internal gear meshing with the planetary-differential gear, and an internal gear member meshing with the planetary-differential gear and rotatable about the shaft axis.

The driving mechanism further includes a motion transmitting means concentric with the motor shaft and connected to the speed reducer means and including means for translating rotary motion of the speed reducer means to oscillating motion through a fixed angle of oscillation and forming oscillating driving means for the windshield wipers and the like. This motion transmitting means includes an eccentric carried and rotated by the internal gear member of the planetary-differential reducer, a slider reciprocated by the eccentric, a guide member slidably supporting the slider, and a pinion rotatably mounted about the shaft axis and meshing with the rack and oscillated thereby through the fixed angle of oscillation and forming the oscillating driving means for the windshield wipers and the like.

Control means is provided for the driving mechanism and the control means includes means for stopping operation of the motor with the oscillating driving means at one end of the fixed angle of oscillation thereof, and also includes means for shifting the fixed angle of oscillation of the oscillating driving means when operation of the motor is stopped for parking the windshield wipers and the like beyond the fixed angle of oscillation. This latter part of the control means includes means for rotatably moving the guide member about the shaft axis for shifting the fixed angle of oscillation of the oscillating driving means.

Further objects of this invention reside in the details of construction of the driving mechanism and in the cooperative relationships between the component parts thereof.

Other objects and advantages of this invention will become apparent to those skilled in the art upon reference to the accompanying specification, claims and drawings, in which:

Fig. 1 is a side elevational view of the driving mechanism of this invention;

Fig. 2 is an end elevational view of the driving mechanism looking from the right of Fig. 1;

Fig. 3 is an enlarged vertical sectional view taken substantially along the line 3—3 of Fig. 2;

Fig. 4 is a vertical sectional view taken substantially along the line 4—4 of Fig. 3;

Fig. 5 is a vertical sectional view taken substantially along the line 5—5 of Fig. 3;

Fig. 6 is a partial sectional view similar to Fig. 5 but illustrating the rack shifted to parking position;

Fig. 7 is a vertical sectional view taken substantially along the line 7—7 of Fig. 3;

Figs. 8 and 9 are partial views of a portion of the mechanism illustrated in Fig. 5 showing different operating positions of the parts for controlling the switch means.

Fig. 10 is a wiring diagram showing the manner of starting and stopping and controlling the speed of operation of the electric motor.

Fig. 11 is a chart showing the fixed angle of oscillation of the driving mechanism and the manner in which the fixed angle of oscillation is shifted for purposes of parking the windshield wipers and the like beyond the fixed angle of oscillation.

Figs. 12 and 13 are partial vertical sectional views taken substantially along the line 12—12 of Fig. 3 and illustrating the manner in which the guide member is shifted for parking the windshield wipers and the like.

The driving mechanism of this invention, for driving windshield wipers and the like, is generally designated at 10 and it includes an electric motor having a substantially cylindrical housing 11 and a motor structure 12 located therein, for rotating a motor shaft 13. The electric motor is of conventional construction and is driven by the electric system of the automotive vehicle. In Fig. 10 the electric motor 12 is shown to be a shunt type D.C. motor having a wound armature 14 driving the shaft 13 and a shunt field 15, current being supplied to the electric motor by a storage battery 16 which may be of the 12-volt type. The motor is of such construction that it will have a controllable speed and good torque characteristics over a range of substantially 1500 to 6000 r.p.m. The housing 11 is provided with an end cap or plate 17 having a cylindrical flange 17' fitting over the housing 11, and the entire construction is held in assembled relation by assembly screws 18.

Suitably secured to the motor shaft 13 adjacent the motor structure 12 is a flanged collar 20, which may be formed from nylon or the like. Adjacent the collar 20 is a gear member 21 having a hub 22 for rotatably mounting the same on the motor shaft 13, a sleeve bearing 26, formed of nylon or the like, being interposed between the gear member 21 and the shaft 13. This gear member 21 is provided with a bifurcated extension 23, which receives one of the assembly screws 18 for securing the gear member 21 against rotation. The gear member 21 is provided with internal gear teeth 24, and preferably the gear member 21 is formed of powdered iron or the like, which is preferably impregnated with a suitable lubricant. The gear member 21 is also provided with internal gear teeth 25. The internal gear teeth 24 of the gear member 21 form a part of a planetary speed reducer which also includes a carrier 27 located adjacent the gear member 21 and rotatably mounted on the sleeve bearing 26. This carrier 27 is also preferably made from powdered iron or the like which has been impregnated with a suitable lubricant. The carrier 27 is integrally provided with a pin 28 upon which is rotatably mounted a planetary gear 29, preferably formed of nylon or the like. The planetary gear 29 meshes with the internal gear teeth 24 of the gear member 21, and also with the gear teeth on a drive gear 30 suitably secured to the motor shaft 13. The drive gear 30 is preferably made of powdered iron or the like. The drive gear, which is rotated by the motor shaft 13, in meshing with the planetary gear 29 operates to rotate the planetary gear, and, since the planetary gear 29 meshes with the stationary internal gear 24, the carrier 27 is rotated in the same direction as the motor shaft 13, but at a reduced speed, which speed is determined by the speed reduction ratio afforded by the gears 30, 29 and 24.

The driving mechanism also includes a planetary-differential speed reducer and the latter includes a pin 31 integrally formed on the carrier 27 of the planetary speed reducer. Rotatably mounted on the pin 31 is a planetary-differential gear 32 which is preferably formed of nylon or the like. The gear 32 meshes with the stationary internal gear 25 formed in the gear member 21. This planetary-differential gear 32 also meshes with an internal gear 33, formed in an internal gear member 34, which is rotatably mounted on the shaft 13, and which also partially overlaps the stationary gear member 21. The internal gear member 34 is preferably formed from steel or the like. As the carrier 27 is rotated, the planetary-differential gear 32, meshing with the stationary internal gear 25 and the rotatable internal gear 33, causes the internal gear member 34 to rotate in the same direction as the shaft, since the rotatable internal gear 33 has less teeth than the internal stationary gear 25. The speed of rotation of the gear member 34 with respect to the carrier 27 is determined by the gear ratios between the internal gears 33 and 35. The gear member 34 is integrally provided with an eccentric 35.

For purposes of illustration in this application, the drive gear 30 has 16 teeth, a pitch diameter of .666 inch, and a 24 pitch, the planetary gear 29 has 10 teeth, a pitch diameter of .417 inch, and a 24 pitch, and the stationary internal gear 24 has 36 teeth, a pitch diameter of 1.50 inch, and a 24 pitch. This arrangement of these gears results in a speed reduction ratio of substantially 3.25 to 1. The planetary-differential gear 32 has 8 teeth, a pitch diameter of .500 inch, and a 16 pitch, the stationary internal gear 25 has 26 teeth, a pitch diameter of 1.625 and a 16 pitch, and the rotatable internal gear 33 has 25 teeth, a pitch diameter of 1.625 inch, and substantially a 16 pitch. Since there is a one-tooth difference between the internal gears 25 and 33, the result is a speed reduction ratio of substantially 25 to 1. By the compounded planetary speed reducer and planetary-differential speed reducer there is, therefore, an overall speed reduction ratio of substantially 81.25 to 1. Thus, if the motor shaft 13 is rotated at a speed of 6000 r.p.m., the rotatable internal gear member 34 is rotated at a speed of substantially 74 r.p.m. If, on the other hand, the motor shaft is rotated at a speed of 1600 r.p.m., the rotatable internal gear member 34 is rotated at a speed of substantially 20 r.p.m. Thus, as the speed of rotation of the electric motor is varied between substantially 6000 r.p.m. and 1600 r.p.m., the speed of rotation of the rotatable internal gear member 34 is varied between substantially 74 r.p.m. and 20 r.p.m. Therefore, these particular speeds and speed reduction ratios are particularly adaptable for operating windshield wipers, and the like, in automotive vehicles.

The driving mechanism of this invention also includes a motion transmitting means which is concentrically arranged with respect to the motor shaft, and it includes a slider 38 slidably mounted adjacent the eccentric 35 in a pair of guides 39 formed in a guide member 37. The guide member 37 is normally stationary, but it is rotatably mounted about the motor shaft axis. The guide member 37 is preferably formed from powdered iron or the like, and the slider 38 is preferably formed from nylon or powdered iron or the like. The slider 38 is provided with a pair of ears 40 which extend to each side of the eccentric 35 so that as the eccentric 35 is rotated about the shaft 13 the ears 40 operate to slide the slider 38 back and forth in the guides 39. The slider 38 is provided with a central opening 41, along one edge of which is arranged a toothed rack 42. One end of the slider 38 is also provided with an ear 43.

A pinion 45 provided with a hub 46 is rotatably mounted on the end of the motor shaft 13 and it is provided with teeth 47 meshing with the toothed rack 42 on the slider. The pinion is shown as a mutilated gear, and it is preferably formed from powdered iron or the like, and is preferably impregnated with a suitable lubricant. The hub 46 of the pinion is journalled for rotation in a bearing member 48, preferably formed of porous bronze or the like, which is, in turn, secured within a boss 49 on a cover plate 17. The guide member 37 is also rotatably mounted on this bearing member 48. The space between the boss 49 and the bearing member 48 is provided with a suitable oil wick 50 for applying lubrication to the running surfaces. The end of the shaft 13 carries a ball 51 which is engaged by a plug 52, screw-threaded into the end of the hub 46 of the pinion 45. This plug cooperates with the ball 51 and the motor shaft 13 for the purpose of taking up end play in the drive mechanism. Also, the outer end of the hub 46 of the pinion 45 is provided with a plurality of notches 53 to facilitate securing an arm thereto, which arm is utilized for the purpose of driving the windshield wipers and the like. Thus, as the internal gear member 34 is rotated at speeds ranging from 74 r.p.m. and 20 r.p.m., the pinion 45 is oscillated at a frequency ranging substantially from 74 oscillations per minute to 20 oscillations per minute. The relationships between the pinion 45 and the slider 38 is such as to oscillate the pinion through a fixed angle of oscillation of substantially 120 degrees, this being illustrated more clearly in Fig. 11.

Arranged concentrically about the concentric speed reducer is a C-shaped member 55 formed of suitable electrical insulating material such as Bakelite or the like. This member is provided with an annular recess 56. At one end it is also provided with a pair of concentrically arranged slots 57 and 59, the slot 57 inwardly terminating in a slot 58 arranged parallel to the axis of the shaft 13. Intermediate its ends, the slot 59 communicates with the slot 60, also parallel to the axis of rotation of the shaft 13. Toward the other end of the C-shaped member 55 is a third slot 61, which is also arranged parallel to the axis of the shaft 13. A second C-shaped member 63, also formed of electrical insulating material such as Bakelite or the like, is arranged adjacent the member 55 and it is provided, near one end, with a recess 64, and near its other end with a recess 65, the recesses 64 and 65 communicating with the slots 58 and 61 in the member 55. The member 63 is also provided adjacent one end with slots 66 and 67 which communicate with the slots 57 and 59 in the member 55. The two members 55 and 63 are secured together and to the cover 17 by means of a plurality of rivets 68.

Located within the annular recess 56 in the member 55 is a ring 70 formed of electrical insulating material such as nylon or the like, the ring being channel-shaped in cross-section. Located in the channel is a curved conductor bar or wire 71, which extends through less than one-half the circumference of the channel member 70. Secured to one end of this conductor bar 71, as by soldering, welding or the like, is a helical resistance wire 72. This resistance wire 72 is also arranged within the channel member 70. The conductor bar 71 and resistance wire 72 are suitably secured within the channel 70, as by a pressed fit, heat sealing or the like. Adjacent its upper portion, as illustrated in Figs. 3 and 7, the channel member 70 is provided with a toothed flange 73, which extends parallel to the axis of the shaft 13, and adjacent the bottom of the channel member it may be also provided with a similar plain flange 74 for guiding purposes.

A terminal 76 extends through the slot 58 in the member 55, and this terminal 76 is integrally formed on a spring contact blade 77, which is arranged in the slots 57 and 66 in the members 55 and 63. A brush 78, which may be a carbon brush or the like, is arranged in the recess 64 in the member 63, and it is pressed by a spring 79 against the conductor bar 71 carried by the channel member 70. Thus, the electrical connector or terminal 76 is electrically connected to the spring contact finger 77, and to the conductor bar 71 by the brush 78. A second terminal 81 extends through the slot 61 in the member 55, and it is electrically connected through a similar spring 79 to a carbon brush 82 arranged in the recess 65 in the member 63. This brush 82 contacts the helical resistance wire 72. In one position of the channel member 70, the brush 82 contacts this resistance wire 72 where the latter is secured to the conductor bar 71, and in other positions of the channel member 70, the brush 82 contacts the helical resistance wire 72 at points along its length. A second spring contact member 85 is carried in the slots 59 and 67 of the members 55 and 63, and it is provided with an electrical terminal 86 which extends through the slot 60 in the member 55.

An adjusting pinion, 88, arranged within a recess 89 in the member 63, meshes with the toothed flange 73 on the channel member 70, the pinion 88 being carried by a shaft 90 rotatably mounted in a bass 91 on the cover 17. Thus, as the shaft 90 is rotated, the pinion 88 drives, through the toothed flange 73, the channel member 70 in a rotating manner. Accordingly, the channel member 70 may be rotatably positioned to adjust the positions of the conductor bar 71 and helical resistance wire 72 with respect to the brushes 78 and 82.

The channel member 70 is provided with a radially extending cam 93, which is adapted to engage and disengage a follower 94 on the contact spring 77. The contact spring 77 carries a contact 95 which is adapted to engage a contact 96 on the contact spring 85. The contact spring 85 is provided with an offset tongue 97 which, under certain circumstances, is adapted to be engaged by the ear 43 on the slider 38. The contacts 95 and 96 on the contact springs 77 and 85 operate to start and stop the electric motor, and these contact springs 77 and 85 are operated by two devices (1) the cam 93 on the channel-shaped ring 70 and (2) the ear 43 on the slider 38. The contact springs 77 and 85 are so arranged that the contacts 95 and 96 are normally closed, and this is true, regardless of whether the cam 93 is out of engagement with the follower 94, as illustrated in Fig. 9, or is in engagement therewith, as illustrated in Fig. 8. When the cam 93 engages the follower 94, as illustrated in Fig. 8, the contacts 95 and 96 are closed and the offset tongue 97 is shifted out of the path of movement of the ear 43 on the slider 38, so that the slider is ineffective to separate the contacts 95 and 96.

However, when the cam 93 is moved out from under the follower 94, as illustrated in Fig. 9, the contacts 95 and 96 remain closed, but the offset tongue 97 is moved into the path of the ear 43 on the slider 38. When the slider 38 reaches the end of its movement, as shown in Fig. 5, the ear 43 engages the tongue 97 to separate the contacts 95 and 96. Thus, Fig. 5 illustrates the parts in a position wherein the control means is in the "off" position, and the motor is de-energized with the slider 38 in an end position.

To start the motor, the pinion 88 is rotated by the shaft 90 to move the cam 93 on the channel member 70 underneath the follower 94, as illustrated in Fig. 8, and this operates to close the contacts 95 and 96 to energize the motor. The motor will operate continuously until the cam 93 is moved out from under the follower 94. By further rotating the channel member 70, more and more resistance is connected in series with the field of the motor, which operates to increase the speed of the motor. When the motor is first started, and no resistance is in series with the field, the motor operates at slow speed, as for example, 1600 r.p.m. However, as the channel member 70 is rotated further in the "on" direction, the resistance in series with the field is increased, and when maximum resistance is placed in series, the motor operates at its highest speed of 6000 r.p.m. To de-energize the motor, the cam 93 is moved out from under the follower 94, and the motor continues to operate until such time as the ear 43 on the slider 38 separates the contacts 95 and 96 to stop the motor in an end position of the slider 38.

Fig. 10 illustrates the wiring connections for the motor, like reference characters for like parts being utilized. When the contacts 95 and 96 are closed, the motor is energized and the speed of the motor depends upon the resistance in series with the field winding 15 thereof.

As noted above, all of the parts of the driving mechanism are arranged concentrically about the axis of the motor shaft 13, and all of the parts are enclosed within a substantially cylindrical flange 17' on the end cover 17. To shift the range of oscillation of the pinion 47 and the wipers driven thereby, all that is necessary is to adjustably position the entire driving mechanism about the motor shaft axis. This is effectively accomplished by the same means for mounting the driving mechanism. Toward this end, the end plate 17 is provided with a pair of projections 100, which extend through slots 101, in a strap type mounting bracket 102. The mounting bracket 102 is provided with a pair of mounting ears 103, which have holes therein for mounting the same to any desired support. Thus, it is seen that the drive mechanism and its housing 11 may be rotatably positioned with respect to the mounting bracket 102, the extent of rotatable adjustment being determined by the extent of the slots 101. When the drive mechanism is arranged in its proper adjusted position, it is clamped in that position by tightening the screw and nut 105, 106, extending through ears 104, on the ends of the strap type bracket 102. This provides a ready means for installing and properly angularly locating the driving mechanism so as to predetermine the position of the fixed angle of oscillation of the driving means for the windshield wipers and the like.

As shown more clearly in Figs. 3, 6, 12 and 13, the pinion 88 is provided with a cam member 110 having a high dwell and a low dwell 112. The high dwell of the cam member 110 is normally arranged within a locking recess 111 in a flange 113 on the guide member 37, so as to lock the guide member against rotation as shown in Figs. 3 and 5. The guide member 37 is also provided with a limited number of teeth 114, for example, 3 teeth behind the flange 113 to one side of the locking recess 111. These teeth 114 are adapted to be engaged by the teeth on the pinion 88. When the pinion 88 is rotated to the "off" position, where the cam 93 engages the follower 94 on the spring contact arm 77 to stop operation of the electric motor, the teeth on the pinion 88 engage the teeth 113 on the carrier 37, as shown in Fig. 12, and further rotation of the pinion 88 beyond the "off" position operates to rotate the guide member 37, as shown in Figs. 6 and 13. This, in turn, operates to tilt the slider 38, which causes the pinion 45 to rotate beyond the end of the fixed angle of oscillation thereof. This rotatable movement of the guide member 37, and the corresponding rotation of the pinion 45, is permitted by the high dwell of the cam member 110, moving out of the recess 111 and the low dwell 112 of the cam aligning with the flange 113 on the guide member 37. The extent of this additional movement is limited by the high dwell of the cam member 110 engaging the flange 113 of the guide member 37, as shown in Fig. 13. Thus, the pinion 45 and the windshield wipers and the like operated thereby are moved beyond the end of the fixed angle of oscillation a predetermined amount, as, for example, 15 degrees, as illustrated in Fig. 11. Thus, rotation of the pinion 88 beyond the "off" position operates to park the windshield wipers and the like beyond the end of the fixed angle of oscillation thereof.

While for purposes of illustration, one form of this invention has been disclosed, other forms thereof may become apparent to those skilled in the art upon reference to this disclosure and, therefore, this invention is to be limited only by the scope of the appended claims.

I claim as my invention:

1. A driving mechanism for windshield wipers and the like comprising, an electric motor, a shaft rotated by the motor, a planetary reducer concentric with the motor shaft and including a drive gear driven by the shaft, a stationary internal gear, a planetary gear meshing with the drive gear and the internal gear, and a carrier carrying the planetary gear and rotatable about the shaft axis, a planetary-differential reducer concentric with the motor shaft and including a planetary-differential gear carried by the carrier of the planetary reducer, a stationary internal gear meshing with the planetary-differential gear, and an internal gear member meshing with the planetary-differential gear and rotatable about the shaft axis, and motion transmitting means concentric with the motor shaft including an input member rotatable about the shaft axis and connected to the internal gear member of the planetary-differential reducer, an output member oscillatable about the shaft axis and means for translating rotary motion of the input member to oscillating motion of the output member through a fixed angle of oscillation and forming oscillating driving means for the windshield wipers and the like.

2. A driving mechanism for windshield wipers and the like comprising, an electric motor, a shaft rotated by the motor, a planetary reducer concentric with the motor shaft and including a drive gear driven by the shaft, a stationary internal gear, a planetary gear meshing with the drive gear and the internal gear, and a carrier carrying the planetary gear and rotatable about the shaft axis, a planetary-differential reducer concentric with the motor shaft and including a planetary-differential gear carried by the carrier of the planetary reducer, a stationary internal gear meshing with the planetary-differential gear, and an internal gear member meshing with the planetary-differential gear and rotatable about the shaft axis, and motion transmitting means concentric with the motor shaft and including an eccentric carried by the internal gear member of the planetary-differential reducer for rotation about the shaft axis, a slider reciprocated by the eccentric and having a rack thereon, and a pinion rotatably mounted about the shaft axis and meshing with the rack and oscillated thereby about the shaft axis through a fixed angle of oscillation and forming oscillating driving means for the windshield wipers and the like.

3. A driving mechanism for windshield wipers and the like comprising, an electric motor, a shaft rotated by the motor, a compounded planetary and planetary-differential speed reducer means concentric with the motor shaft and rotated at a reduced speed thereby, and motion transmitting means concentric with the motor shaft including an input member rotatable about the shaft axis and connected to the speed reducer means, an output member oscillatable about the shaft axis and means for translating rotary motion of the input member to oscillating motion of the output member through a fixed angle of oscillation and forming oscillating driving means for the windshield wipers and the like.

4. A driving mechanism for windshield wipers and the like comprising, an electric motor, a shaft rotated by the motor, a speed reducer means concentric with the motor shaft and rotated at a reduced speed thereby, and motion transmitting means concentric with the motor shaft including an input member rotatable about the shaft axis and connected to the speed reducer means, an output member oscillatable about the shaft axis and means for translating rotary motion of the input member to oscillating motion of the output member through a fixed angle of oscillation and forming oscillating driving means for the windshield wipers and the like, and control means for the driving mechanism including means for stopping operation of the motor with the oscillating driving means at one end of the fixed angle of oscillation thereof, and including means for shifting the fixed angle of oscillation for parking the windshield wipers and the like beyond the fixed angle of oscillation.

5. A driving mechanism for windshield wipers and the like comprising, an electric motor, a shaft rotated by the motor, a planetary reducer concentric with the motor shaft and including a drive gear driven by the shaft, a stationary internal gear, a planetary gear meshing with the drive gear and the internal gear, and a carrier carrying the planetary gear and rotatable about the shaft axis, a planetary-differential reducer concentric with the motor shaft and including a planetary-differential gear carried by the carrier of the planetary reducer, a stationary internal gear meshing with the planetary-differential gear, and an internal gear member meshing with the planetary-differential gear and rotatable about the shaft axis, and motion transmitting means concentric with the motor shaft including an input member rotatable about the shaft axis and connected to the internal gear member of the planetary-differential reducer, an output member oscillatable about the shaft axis and means for translating rotary motion of the input member to oscillating motion of the output member through a fixed angle of oscillation and forming oscillating driving means for the windshield wipers and the like, and control means for the driving mechanism including means for stopping operation of the motor with the oscillating driving means at one end of the fixed angle of oscillation thereof, and including means for shifting the fixed angle of oscillation for parking the windshield wipers and the like beyond the fixed angle of oscillation.

6. A driving mechanism for windshield wipers and the like comprising, an electric motor, a shaft rotated by the motor, a planetary reducer concentric with the motor shaft and including a drive gear driven by the shaft, a stationary internal gear, a planetary gear meshing with the drive gear and the internal gear, and a carrier carrying the planetary gear and rotatable about the shaft axis, a planetary-differential reducer concentric with the motor shaft and including a planetary-differential gear carried by the carrier of the planetary reducer, a stationary internal gear meshing with the planetary-differential gear, and an internal gear member meshing with the planetary-differential gear and rotatable about the shaft axis, and motion transmitting means concentric with the motor shaft and including an eccentric carried by the internal gear member of the planetary-differential reducer for rotation about the shaft axis, a slider reciprocated by the eccentric and having a rack thereon, and a pinion rotatably mounted about the shaft axis and meshing with the rack and oscillated thereby about the shaft axis through a fixed angle of oscillation and forming oscillating driving means for the windshield wipers and the like, and control means for the driving mechanism including means for stopping operation of the motor with the oscillating driving means at one end of the fixed angle of oscillation thereof, and including means for shifting the fixed angle of oscillation for parking the windshield wipers and the like beyond the fixed angle of oscillation.

7. A driving mechanism for windshield wipers and the like comprising, an electric motor, a shaft rotated by the motor, a compounded planetary and planetary-differential speed reducer means concentric with the motor shaft and rotated at a reduced speed thereby, and motion transmitting means concentric with the motor shaft including an input member rotatable about the shaft axis and connected to the speed reducer means, an output member oscillatable about the shaft axis and means for translating rotary motion of the input member to oscillating motion of the output member through a fixed angle of oscillation and forming oscillating driving means for the windshield wipers and the like, and control means for the driving mechanism including means for stopping operation of the motor with the oscillating driving means at one end of the fixed angle of oscillation thereof, and including means for shifting the fixed angle of oscillation for parking the windshield wipers and the like beyond the fixed angle of oscillation.

8. A driving mechanism for windshield wipers and the like comprising, an electric motor, a shaft rotated by the motor, a speed reducer means concentric with the motor shaft and rotated at a reduced speed thereby, motion transmitting means concentric with the motor shaft and including an eccentric rotated by the speed reducer means about the shaft axis, a slider reciprocated by the eccentric and having a rack thereon, a guide member slidably supporting the slider, and a pinion rotatably mounted about the shaft axis and meshing with the rack and oscillated thereby about the shaft axis through a fixed angle of oscillation and forming oscillating driving means for the windshield wipers and the like, and means for rotatably adjustably mounting the guide member about the shaft axis for adjustably shifting the fixed angle of oscillation of the oscillating driving means.

9. A driving mechanism for windshield wipers and the like comprising, an electric motor, a shaft rotated by the motor, a speed reducer means concentric with the motor shaft and rotated at a reduced speed thereby, motion transmitting means concentric with the motor shaft and including an eccentric rotated by the speed reducer means about the shaft axis, a slider reciprocated by the eccentric and having a rack thereon, a guide member slidably supporting the slider, and a pinion rotatably mounted about the shaft axis and meshing with the rack and oscillated thereby about the shaft axis through a fixed angle of oscillation and forming oscillating driving means for the windshield wipers and the like, and control means for the driving mechanism including means for stopping operation of the motor with the oscillating driving means at one end of the fixed angle of oscillation thereof, and including means for rotatably moving the guide member about the shaft axis for shifting the fixed angle of oscillation of the oscillating driving means when operation of the motor is stopped for parking the windshield wipers and the like beyond the fixed angle of oscillation.

10. A driving mechanism for windshield wipers and the like comprising, an electric motor, a shaft rotated by the motor, a compounded planetary and planetary-differential speed reducer means concentric with the motor shaft and rotated at a reduced speed thereby, motion transmitting means concentric with the motor shaft and including an eccentric rotated by the speed reducer means about the shaft axis, a slider reciprocated by the eccentric and having a rack thereon, a guide member slidably supporting the slider and a pinion rotatably mounted about the shaft axis and meshing with the rack and oscillated thereby about the shaft axis through a fixed angle of oscillation and forming oscillating driving means for the windshield wipers and the like, and means for rotatably adjustably mounting the guide member about the shaft axis for adjustably shifting the fixed angle of oscillation of the oscillating driving means, 11. A driving mechanism for windshield wipers and the like comprising, an electric motor, a shaft rotated by the motor, a compounded planetary and planetary-differential speed reducer means concentric with the motor shaft and rotated at a reduced speed thereby, motion transmitting means concentric with the motor shaft and including an eccentric rotated by the speed reducer means about the shaft axis, a slider reciprocated by the eccentric and having a rack thereon, a guide member slidably supporting the slider, and a pinion rotatably mounted about the shaft axis and meshing with the rack and oscillated thereby through a fixed angle of oscillation and forming oscillating driving means for the windshield wipers and the like, and control means for the driving mechanism including means for stopping operation of the motor with the oscillating driving means at one end of the fixed angle of oscillation thereof, and including means for rotatably moving the guide member about the shaft axis for shifting the fixed angle of oscillation of the oscillating driving means when operation of the motor is stopped for parking the windshield wipers and the like beyond the fixed angle of oscillation.

12. A driving mechanism for windshield wipers and the like comprising, an electric motor, a shaft rotated by the motor, a planetary reducer concentric with the motor shaft and including a drive gear driven by the shaft, a stationary internal gear, a planetary gear meshing with the drive gear and the internal gear, and a carrier carrying the planetary gear and rotatable about the shaft axis, a planetary-differential reducer concentric with the motor shaft and including a planetary-differential gear carried by the carrier of the planetary reducer, a stationary internal gear meshing with the planetary-differential gear, and an internal gear member meshing with the planetary-differential gear and rotatable about the shaft axis, motion transmitting means concentric with the motor shaft and including an eccentric carried by the internal gear member of the planetary-differential reducer for rotation about the shaft axis, a slider reciprocated by the eccentric and having a rack thereon, a guide member slidably supporting the slider, and a pinion rotatably mounted about the shaft axis and meshing with the rack and oscillated thereby about the shaft axis through a fixed angle of oscillation and forming oscillating driving means for the windshield wipers and the like, and means for rotatably adjustably mounting the guide member about the shaft axis for adjustably shifting the fixed angle of oscillation of the oscillating driving means.

13. A driving mechanism for windshield wipers and the like comprising, an electric motor, a shaft rotated by the motor, a planetary reducer concentric with the motor shaft and including a drive gear driven by the shaft, a stationary internal gear, a planetary gear meshing with the drive gear and the internal gear, and a carrier carrying the planetary gear and rotatable about the shaft axis, a planetary-differential reducer concentric with the motor shaft and including a planetary-differential gear carried by the carrier of the planetary reducer, a stationary internal gear meshing with the planetary-differential gear, and an internal gear member meshing with the planetary-differential gear and rotatable about the shaft axis, motion transmitting means concentric with the motor shaft and including an eccentric carried by the internal gear member of the planetary-differential reducer for rotation about the shaft axis, a slider reciprocated by the eccentric and having a rack thereon, a guide member slidably supporting the slider, and a pinion rotatably mounted about the shaft axis and meshing with the rack and oscillated thereby about the shaft axis through a fixed angle of oscillation and forming oscillating driving means for the windshield wipers and the like, and control means for the driving mechanism including means for stopping operation of the motor with the oscillating driving means at one end of the fixed angle of oscillation thereof, and including means for rotatably moving the guide member about the shaft axis for shifting the fixed angle of oscillation of the oscillating driving means when operation of the motor is stopped for parking the windshield wipers and the like beyond the fixed angle of oscillation.

References Cited in the file of this patent

UNITED STATES PATENTS

| | | |
|---|---|---|
| 78,927 | Christiansen | June 16, 1868 |
| 1,123,172 | Compton | Dec. 29, 1914 |
| 1,268,131 | Ledwinka | June 4, 1918 |
| 1,622,842 | Powell | Mar. 29, 1927 |
| 2,168,164 | Kittredge | Aug. 1, 1939 |
| 2,420,526 | Dixon | May 13, 1947 |
| 2,538,750 | Lappin | Jan. 23, 1951 |
| 2,720,790 | Sacchini | Oct. 18, 1955 |